US007006459B2

(12) United States Patent
Kokot et al.

(10) Patent No.: US 7,006,459 B2
(45) Date of Patent: Feb. 28, 2006

(54) WIRELESS COMMUNICATIONS SYSTEM

(75) Inventors: Mathias Kokot, München (DE); Hermann Rodler, Oberhaching (DE)

(73) Assignee: Siemens Aktiengesellschaft, Munich (DE)

(*) Notice: Subject to any disclaimer, the term of this patent is extended or adjusted under 35 U.S.C. 154(b) by 910 days.

(21) Appl. No.: 09/782,736

(22) Filed: Feb. 13, 2001

(65) Prior Publication Data

US 2001/0030951 A1 Oct. 18, 2001

Related U.S. Application Data

(63) Continuation of application No. PCT/DE99/01948, filed on Jul. 1, 1999.

(30) Foreign Application Priority Data

Aug. 13, 1998 (DE) ................................ 198 36 750

(51) Int. Cl.
*H04L 12/66* (2006.01)

(52) U.S. Cl. .................................... 370/310.2; 370/328

(58) Field of Classification Search ............. 370/310.1, 370/310.2, 328, 329, 340, 341, 389, 392, 370/400, 401, 465, 466, 469; 455/507, 509, 455/517; 709/227, 238
See application file for complete search history.

(56) References Cited

U.S. PATENT DOCUMENTS 5,475,689 A 12/1995 Kay et al.
5,544,164 A 8/1996 Baran
5,590,133 A * 12/1996 Billstrom et al. ........... 370/349
5,684,791 A * 11/1997 Raychaudhuri et al. .. 370/310.2
5,787,080 A 7/1998 Hulyalkar et al.
5,787,360 A * 7/1998 Johnston et al. ............ 455/524
5,854,786 A * 12/1998 Henderson et al. ......... 370/335
5,953,322 A * 9/1999 Kimball ...................... 370/328
6,075,783 A * 6/2000 Voit ........................... 370/352
6,097,733 A * 8/2000 Basu et al. ................. 370/468
6,400,701 B1 * 6/2002 Lin et al. .................... 370/336
6,570,871 B1 * 5/2003 Schneider ................... 370/356

FOREIGN PATENT DOCUMENTS

DE 19533597 A1 3/1997
DE 19638814 A1 3/1998
DE 19755946 A1 7/1998
DE 19702028 A1 8/1998

(Continued)

OTHER PUBLICATIONS

"A Mixed Voice and Data Protocol for Digital Cellular Radio", J.Y. Khan et al., XP-002124844, pp. 108-114.

(Continued)

*Primary Examiner*—Ricky Ngo
*Assistant Examiner*—Duc Duong
(74) *Attorney, Agent, or Firm*—Laurence A. Greenberg; Werner H. Stemer; Ralph E. Locher

(57) ABSTRACT

A communications system includes a base station and mobile terminals. Voice data are transmitted within data packets in asynchronous transmission. The base station has an air interface for implementing first partial connections to the mobile terminals and a network interface to a communication network via which second partial connections to further terminals can be implemented. The base station also contains a router for allocating data packets which arrive in existing first or second partial connections to second or first partial connections. The allocation is done in dependence on an address information item which specifies a terminal in the sense of a transmission destination and is in each case contained in the individual data packets. The mobile terminals also contain in each case a voice compression device and/or a voice decompression device.

9 Claims, 2 Drawing Sheets

FOREIGN PATENT DOCUMENTS

EP 0590412 A1 4/1994

OTHER PUBLICATIONS

"A Combined LLC/MAC Traffic Analysis of the Radio Interface in TDMA-Based Third Generation Mobile Systems", Davide Grillo et al., dated May 10, 1992, pp. 848-851.

Published International Application No. 94/28645 (Acampora et al.,), dated Dec. 8, 1994.

* cited by examiner

WIRELESS COMMUNICATIONS SYSTEM

CROSS-REFERENCE TO RELATED APPLICATION

This is a continuation of copending International Application PCT/DE99/01948, filed Jul. 1, 1999, which designated the United States.

BACKGROUND OF THE INVENTION

Field of the Invention

In many communications systems, terminals which can be used for different purposes such as, e.g., the transmission of voice, video, fax, file, program and/or measurement data, are increasingly coupled to the systems wirelessly. Such mobile terminals are frequently coupled via a multi-channel air interface to a base station, which in turn, is connected to a communication network. In the text which follows, mobile terminals are also understood to be so-called cordless terminals. Via the base station, connections are established between the mobile terminals coupled to it and other terminating equipment connected to the communication network. In that configuration, the base station acts, among other things, as converter between transmission protocols used in the communication network and transmission protocols of the air interface.

The type of wireless network connection described is used a lot, especially in the case of mobile terminals for voice communication. In this connection, the invention relates to a communications system which is also provided for voice communication and comprises a base station which can be connected to a communication network and mobile terminals coupled to it wirelessly.

Base stations provided for voice communication have hitherto been known which have to be operated on an ISDN communication network such as, e.g. the public telephone network. It is possible to create connections between the mobile terminals and other terminating equipment connected to the ISDN communication network via such base stations. For this purpose, the base stations are equipped for converting between an ISDN transmission protocol used in the ISDN communication network and a transmission protocol of the air interface.

It is frequently also possible to transmit data of other categories such as, for example, video data or file data to be exchanged when a portable computer is connected wirelessly to a data network, between the ISDN communication network and mobile terminals via the base station in parallel with the voice transmission. Differently from digitized voice signals which are to be transmitted at their largely constant data rate, file data to be transmitted frequently, however, occur in bursts, that is to say at a greatly varying data rate. Since an ISDN communication network is designed for synchronized data transmission and does not, therefore, allow the bandwidth to be varied dynamically, an overload situation can occur during a transmission of burst-type file data if the data rate of the file data temporarily exceeds a predetermined transmission bandwidth. To avoid such a situation, the file data must either be buffered—which delays their transmission—or a transmission bandwidth must be provided which is dimensioned in accordance with the peak data rate to be expected, which is often relatively high.

In many cases, data must be exchanged between a mobile terminal and an external data network such as, for example, the Internet or another network provided for the communication of data processing systems. However, in the case of a base station which must be operated on an ISDN communication network, such a data exchange requires an additional facility such as, e.g. a modem or a so-called gateway computer by means of which the data are converted between the external data network and the ISDN communication network.

SUMMARY OF THE INVENTION

The object of the present invention is to provide a wireless communications system which overcomes the above-noted deficiencies and disadvantages of the prior art devices and methods of this general kind, which is also provided for voice communication and which is equipped with at least one base station and mobile terminals coupled to it wirelessly and which allows a data exchange via external data networks with little expenditure.

With the above and other objects in view there is provided, in accordance with the invention, a communications system with a base station and mobile terminals. The novel communications system has the following characteristics:

- the base station has an air interface for implementing wireless, first partial connections to the mobile terminals and a network interface to a communication network configured to establish second partial connections to further terminals, wherein voice data to be transmitted in each case are transmitted within data packets to be transmitted asynchronously for the first and second partial connections;
- the individual data packets each contains an address information item unambiguously specifying one of the mobile terminals or further terminals in the communication network as a transmission destination and directing the data packets to the respective transmission destination within the communication network;
- the base station includes a router configured to allocate data packets arriving in existing first or second partial connections to second or first partial connections in dependence on the address information item contained in each data packet; and
- the mobile terminals have voice compression devices for compressing voice data to be transmitted from the mobile terminal to the base station, and/or voice decompression devices for decompressing voice data received by the respective mobile terminal.

An essential advantage of the communications system according to the invention consists in that it can be coupled directly to a packet-switching communication network such as, for example, the Internet or a data network, via the base station. This does not require additional facilities for converting data to be exchanged with the communication network such as, e.g., a modem or a gateway computer. Since transport of voice data or other user data in a communications system according to the invention such as in a packet-switching communication network is based on the asynchronous transmission of data packets, the data packets can be exchanged directly between the communications system according to the invention and a packet-switching communication network when a common transmission protocol such as, e.g., the Internet protocol is used. The communications system according to the invention can thus be integrated into a packet-switching communication network with little expenditure which is an advantageous characteristic particularly with regard to the present development of ever more powerful packet-switching communication networks.

Furthermore, data of other categories such as, e.g., video, fax, file, program or measurement data can also be transmitted in addition to voice data, within data packets to be transmitted asynchronously by means of the communications system according to the invention. The data packets are forwarded by the router by means of an address information item contained in the respective data packets. Since data packets can be forwarded independently of the category of data contained in the data packets, no discrimination or special treatment of data of different categories is required in the base station. Differentiation with respect to the category of the data to be transmitted is only necessary in a respective destination terminal. This makes it possible to transfer the advantages associated with an integrated voice and data transmission in wire-connected packet-switching communication networks to wireless communications systems.

A further advantage of the communications system according to the invention consists in that a transmission rate with which voice data or data of other categories are transmitted can be easily adapted to the current data volume by correspondingly varying the rate at which the data packets to be transmitted are generated and/or transmitted.

A voice compression device contained in the mobile terminals is used for compressing the voice data to be sent via the air interface, as a result of which less transmission bandwidth is occupied in the air interface. Correspondingly, a voice decompression device contained in the mobile terminals is used in decompressing voice data received via the air interface which has been compressed before the transmission via the air interface in order to relieve the latter.

In accordance with an added feature of the invention, the communication network is a data network for connecting data processing systems.

The communications system according to the invention can be implemented by air interfaces according to different standards and a number of standards can also be combined. Advantageous embodiments are obtained in particular with air interfaces according to the ETSI Standards DECT (Digital Enhanced Cordless Telecommunications), DCS (Digital Cellular System) or GSM (Global System for Mobile Communication) or an air interface according to the UMTS definition (Universal Mobile Telecommunications system) proposed for standardization; also by means of air interfaces according to the ARI standard PHS (Personal Handyphone System).

In accordance with an advantageous feature of the invention, the network interface is configured for connections to a switching system in an ISDN network.

In accordance with an advantageous feature of the invention, the base station contains a detector by means of which it is possible to check by means of priority information contained in individual data packets, whether the applications to which the data packets are allocated are quasi-real-time applications with predetermined maximum permissible packet transmission period. According to this further development of the invention, the base station also contains a prioritizing device which initiates a preferred transmission of data packets allocated to a quasi-real-time application. In a preferred transmission of data packets, it is also possible to take into consideration several different classes of priority to which the data packets are allocated by means of the priority information contained therein.

According to a further advantageous development of the invention, the base station can also contain a voice compression device and/or a voice decompression device. The voice compression device is used for compressing uncompressed voice data to be transmitted by the other terminals to the mobile terminals before they are transmitted via the air interface. Correspondingly, the voice decompression device is provided for decompressing compressed voice data to be transmitted by the mobile terminals to the other terminals before they are transmitted into the communications system. A base station which is equipped in this manner has the advantage that it is also possible to exchange uncompressed voice data with the further terminals coupled to the communication network which dispenses with the necessity of harmonizing the voice compression methods used in the communications system according to the invention and in the other terminals.

Other features which are considered as characteristic for the invention are set forth in the appended claims.

Although the invention is illustrated and described herein as embodied in a wireless communications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
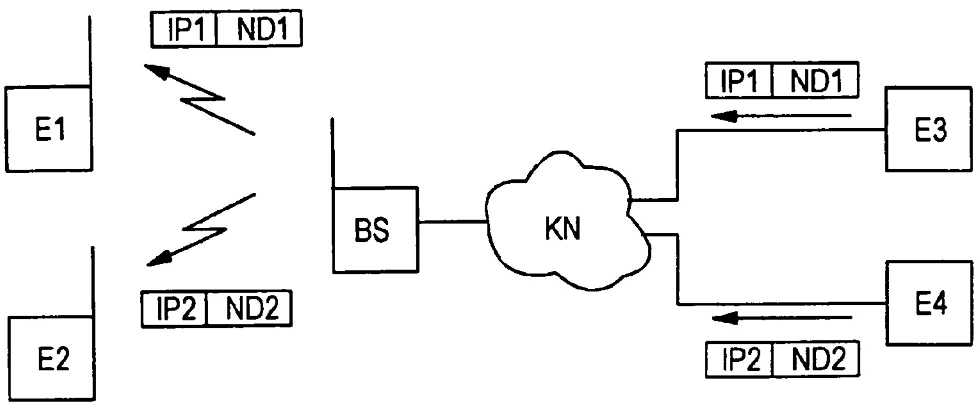
FIG. 1 is a diagrammatic view of a communications system comprising a base station and mobile terminals which are coupled to other terminals via the base station.

Referring now to the figures of the drawing in detail and first, particularly, to FIG. 1 thereof, there is seen a communications system comprising a base station BS and mobile terminals E1 and E2 coupled to it wirelessly. In this configuration, a wireless connection is in each case indicated by stylized lightning arrows. The base station BS is also connected to a communication network KN, e.g. to the Internet or to another data network provided for the communication of data processing systems. Further terminals E3 and E4 are coupled to the data network, which supports an Internet protocol (IP) in the exemplary embodiment. In addition, an unambiguous (with respect to the communication network KN) network address, i.e. in this case an IP address IP1, and respectively, IP2, is in each case allocated to the mobile terminals E1, E2. In addition, the mobile terminals E1, E2 are registered in the base station BS as being available via the base station BS.

In the present exemplary embodiment, a voice connection exists in each case between the mobile terminal E1 and the further terminal E3 and between the mobile terminal E2 and the further terminal E4. In these voice connections, voice signals to be transmitted from the further terminals E3, E4 to the mobile terminals E1, E2, respectively, are digitized and compressed in order to reduce the data volume to be transmitted. The compressed voice data are then inserted as user data ND1 and, respectively, ND2 into data packets to be transmitted asynchronously. These packets are provided with an address information item identifying their respective transmission destination, i.e. with the IP addresses IP1 and, respectively, IP2 of the mobile terminals E1 and E2, and transmitted into the communication network KN. In the communication network KN, the data packets are forwarded to the base station BS by means of their attached IP addresses, IP1, IP2 in accordance with the Internet protocol. From the base station the data packets are transmitted to the mobile terminals E1 and, respectively, E2 via the air interface.

Figure 2:
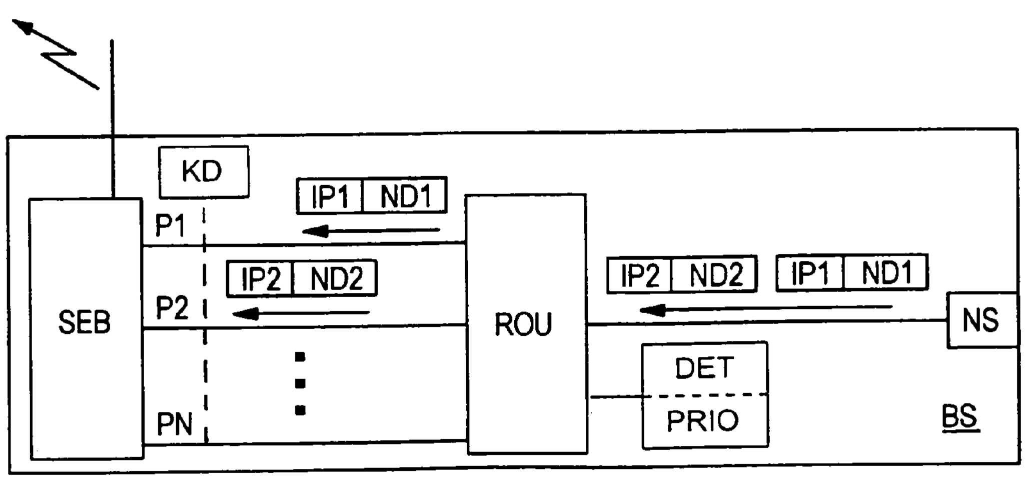
FIG. 2 is a schematic block diagram of the base station.

Referring now to the diagram of FIG. 2, the base station BS contains as functional components a transceiver SEB, a router ROU and a network interface NS for connecting the base station BS to the communication network KN. In this configuration, the router ROU is connected, on the one hand, to the network interface NS via which data can be exchanged with the communication network KN and, on the other hand, coupled via logical or physical ports P1, P2, . . . PN to the transceiver SEB. The transceiver SEB implements an air interface, for example according to the DECT standard, to the mobile terminals E1, E2 and provides a number of wireless transmission channels for an exchange of digital data between the base station BS and mobile terminals E1, E2. In this configuration, the wireless transmission channels are in each case allocated to one of the ports P1, P2, . . . PN.

In the voice connections to the mobile terminals E1, E2, the data packets with the user data ND1 and, respectively, ND2 and the IP addresses IP1 and, respectively, IP2, which are transmitted to the base station BS via the network interface NS, are supplied to the router ROU by the network interface NS. In the router ROU, the IP address of each incoming data packet is read and the transmission destination of the data packet, which is specified by the IP address, is determined. Afterward, a check is made whether this transmission destination is a mobile terminal that can be reached via the base station BS. If this is so, a transmission channel of the air interface which is available for a connection to this mobile terminal is also determined, whereupon the data packet is transmitted to the transceiver SEB via a port P1, P2, . . . or PN allocated to the transmission channel found. In the exemplary embodiment, the mobile terminal E1 is coupled to the base station via a transmission channel allocated to the port P1 and the mobile terminal E2 is coupled to the base station via a transmission channel allocated to the port P2. Correspondingly, the data packet identified by the IP address IP1 is transmitted via the port P1 and the data packet identified by IP address IP2 is transmitted via the port P2 to the transceiver SEB. From the transceiver SEB, the data packets received via the ports P1 and P2 respectively, are then transmitted via the transmission channels of the air interface which are allocated to the ports P1 and P2, respectively, to the mobile terminals E1 and E2, respectively.

Quasi-real-time transmission requires the allocation of the maximum available bandwidth and priority handling over non-critical or not-so-critical transmission. Accordingly, the base station may be equipped with a detector device DET which checks the data packets with respect to quasi-real-time requirements of applications allocated to the data packets. Such quasi-real-time requirements are contained in priority information items in individual data packets. A corresponding prioritizing device PRIO in the base station (BS) then initiates a preferred transmission of the data packets that are found to be allocated to quasi-real-time applications.

Figure 3:
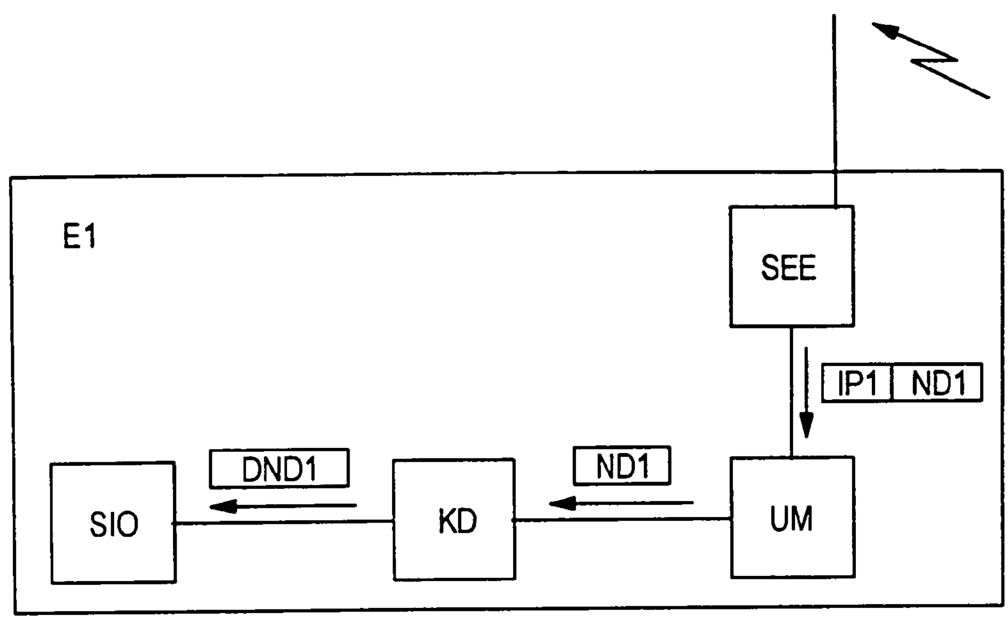
FIG. 3 is a schematic block diagram of a mobile terminal.

FIG. 3 shows a diagram of the mobile terminal E1. It contains as functional components a transceiver SEE, a conversion module UM, a compressing/decompressing device KD and an input/output module SIO for voice data. The individual functional components are connected in series in the order in which they have been enumerated.

The data packet containing user data ND1 and IP address IP1, which is sent to the mobile terminal E1 in the voice connection, is received by the transceiver SEE and forwarded to the conversion module UM. In the conversion module UM, the user data ND1 are extracted from the data packet and assembled with the extracted user data contents of other data packets transmitted in the voice connection to the terminal E1, to form a continuous user data stream. The conversion module UM is frequently also called segmentation and reassembly module. The extracted user data ND1 are then supplied as part of the user data stream to the compressing/decompressing device KD where the user data ND1 or, respectively the user data stream, are decompressed. As a result of the decompression, the original digitized voice signals DND1 are reconstructed from the user data ND1 and are finally supplied as part of a decompressed user stream to the input/output device SIO where they are output as speech.

To transmit voice signals also in the reverse direction, i.e. from the mobile terminal E1 to the further terminal E3, in the voice connection, the sequence described above must be appropriately reversed. In this case, the voice signals are input in the input/output device SIO from where they are supplied in digital form to the compressing/decompressing device KD to be compressed. The compressed voice data are then inserted in the conversion module UM into data packets which are provided with the IP address of the further terminal E3 and are wirelessly transmitted to the base station BS by the transceiver SEE. In the base station BS the received data packets are then transmitted by the transceiver SEB via one of ports P1, P2, . . . PN to the router ROU where the IP addresses of the data packets are used for deciding where a particular data packet is to be forwarded to. In the present case, the router ROU detects that the destination terminal E3 specified by the IP address does not belong to the mobile terminals E1, E2 coupled to the base station BS and therefore forwards the data packets provided with this IP address into the communication network KN via the network interface NS. In the communication network KN, the data packets are then forwarded by means of the IP addresses in accordance with the Internet protocol to the terminal E3 where the voice data are extracted from the data packets and, after decompression, are output as speech.

We claim:

1. A communications system, comprising:

a base station and mobile terminals;

said base station having an air interface for implementing wireless, first partial connections to said mobile terminals and a network interface to a communication network configured to establish second partial connections to further terminals, wherein voice data to be transmitted in each case are transmitted within data packets to be transmitted asynchronously for the first and second partial connections;

the individual data packets each containing an address information item unambiguously specifying one of the mobile terminals or further terminals in the communication network as a transmission destination and directing the data packets to the respective transmission destination within the communication network;

said base station including a router configured to allocate data packets arriving in existing first or second partial connections to second or first partial connections in dependence on the address information item contained in each data packet, a detector device for checking the data packets with respect to quasi-real-time requirements of applications allocated to the data packets via priority information contained in individual data packets, and a prioritizing device configured to initiate a preferred transmission of data packets allocated to quasi-real-time applications; and said mobile terminals each having a voice processing device configured for at least one of compressing voice data to be transmitted to said base station and decompressing compressed voice data transmitted to the respective mobile terminal.

2. The communications system according to claim 1, wherein said voice processing device is a voice decompression device for decompressing voice data received by the respective said mobile terminal.

3. The communications system according to claim 1, wherein said voice processing device is a voice compression device for compressing voice data to be transmitted from the respective said mobile terminal to said base station.

4. The communications system according to claim 1, wherein said voice processing device is a voice compression and decompression device for compressing voice data to be transmitted from the respective said mobile terminal to said base station, and for decompressing voice data received by the respective said mobile terminal.

5. The communications system according to claim 1, wherein the communication network is a data network for connecting data processing systems.

6. The communications system according to claim 1, wherein said base station is configured to implement the air interface in accordance with the ETSI standard DECT.

7. The communications system according to claim 1, wherein said base station is configured to implement the air interface in accordance with the ETSI UMTS definition.

8. The communications system according to claim 1, wherein said network interface is configured for connections to a switching system in an ISDN network.

9. The communications system according to claim 1, wherein said base station further comprises one of a voice compression device for compressing voice data to be transmitted to a respective said mobile terminal and a voice decompression device for decompressing compressed voice data received from a mobile terminal.

* * * * *